(12) United States Patent
Ishiga

(10) Patent No.: US 7,940,983 B2
(45) Date of Patent: May 10, 2011

(54) IMAGE PROCESSING METHOD

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 1008 days.

(21) Appl. No.: 11/792,338

(22) PCT Filed: Dec. 16, 2005

(86) PCT No.: PCT/JP2005/023158
§ 371 (c)(1),
(2), (4) Date: Jun. 5, 2007

(87) PCT Pub. No.: WO2006/064913
PCT Pub. Date: Jun. 22, 2006

(65) Prior Publication Data
US 2008/0095431 A1    Apr. 24, 2008

(30) Foreign Application Priority Data
Dec. 17, 2004  (JP) ................................ 2004-365881

(51) Int. Cl.
*G06K 9/00* (2006.01)
(52) U.S. Cl. ......... 382/167; 382/169; 382/300; 358/521
(58) Field of Classification Search .................. 382/167, 382/169; 348/223.1, 241; 358/504, 518, 358/523, 536
See application file for complete search history.

(56) References Cited

U.S. PATENT DOCUMENTS

| | | | | |
|---|---|---|---|---|
| 4,792,979 A | * | 12/1988 | Nomura et al. ............... | 382/169 |
| 5,091,972 A | | 2/1992 | Kwon et al. | |
| 5,398,121 A | * | 3/1995 | Kowalewski et al. ......... | 358/504 |
| 5,502,580 A | | 3/1996 | Yoda et al. | |
| 5,517,333 A | * | 5/1996 | Tamura et al. ................ | 358/518 |
| 5,796,865 A | * | 8/1998 | Aoyama et al. ............... | 382/169 |
| 5,923,775 A | | 7/1999 | Snyder et al. | |
| 6,160,634 A | * | 12/2000 | Terashita ....................... | 358/1.9 |
| 6,278,800 B1 | | 8/2001 | Madden et al. | |
| 7,489,346 B2 | * | 2/2009 | Mizukura et al. .......... | 348/223.1 |
| 2001/0038716 A1 | | 11/2001 | Tsuchiya et al. | |
| 2004/0201757 A1 | * | 10/2004 | Okada ........................... | 348/241 |

FOREIGN PATENT DOCUMENTS

| | | |
|---|---|---|
| EP | 0 639 818 A1 | 2/1995 |
| EP | 639818 A1 * | 2/1995 |
| EP | 1 781 043 A1 | 5/2007 |
| JP | A 7-92588 | 4/1995 |
| JP | A 7-154623 | 6/1995 |

(Continued)

OTHER PUBLICATIONS

Chen et al, "Optimal transform in perceptually uniform color space and its application in image retrieval", Signal Processing, 2004. Proceedings. ICSP '04. 2004 7th International Conference, p. 1-4, Issue Date: Aug. 31-Sep. 4, 2004.*

Chen et al., "Optimal Transform in Perceptually Uniform Color space and its Application in Image Retrieval," IEEE, vol. 2, pp. 1107-1110, 2004.

Supplementary European Search Report issued in European Application No. 05 81 6611 on Mar. 1, 2010.

(Continued)

*Primary Examiner* — Brian Q Le
*Assistant Examiner* — Mekonen Bekele
(74) *Attorney, Agent, or Firm* — Oliff & Berridge, PLC

(57) ABSTRACT

An image processing method includes: inputting color image data obtained by capturing an image at a given imaging sensitivity level; and converting the color image data to a specific uniform color space determined in correspondence to the imaging sensitivity level.

6 Claims, 10 Drawing Sheets

FOREIGN PATENT DOCUMENTS

Figure 1:
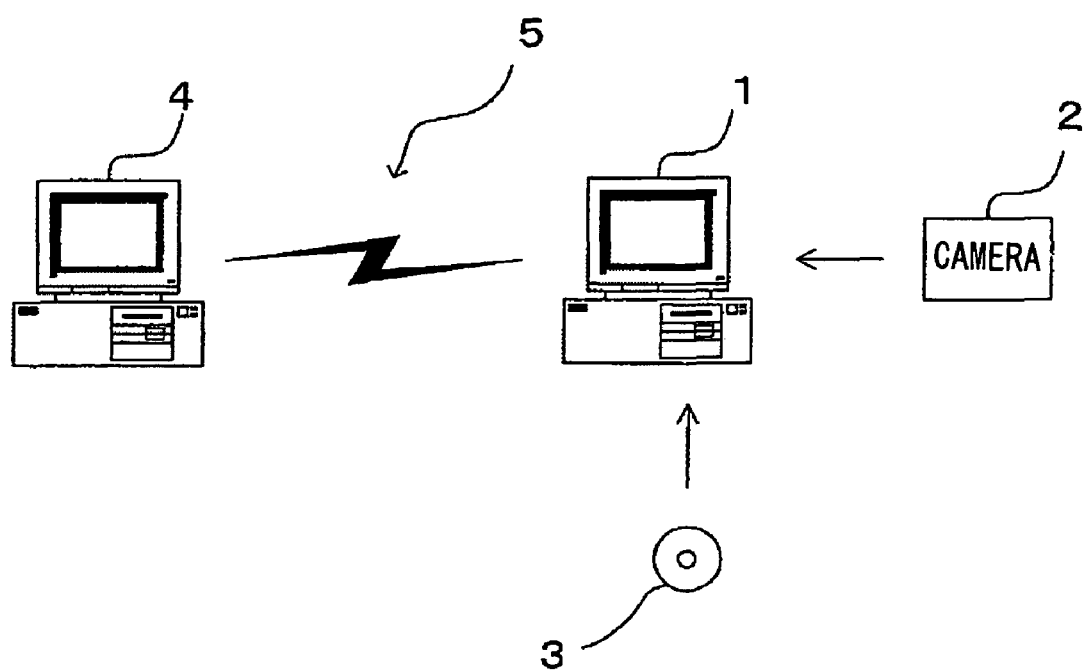

| | | |
|---|---|---|
| JP | A 11-187420 | 7/1999 |
| JP | A 2001-36758 | 2/2001 |
| JP | A 2001-169127 | 6/2001 |
| JP | A 2003-149050 | 5/2003 |
| JP | A 2003-234955 | 8/2003 |
| JP | A 2004-208079 | 7/2004 |
| JP | A 2005-20186 | 1/2005 |

OTHER PUBLICATIONS

Lee, J.S., "Digital Image Smoothing and the Sigma Filter," *Computer Vision, Graphics, and Image Processing,* vol. 24, pp. 255-269 (1983).

Tomassi, C. et al., "Bilateral Filtering for Gray and Color Images," Proceedings of the 1998 IEEE International Conference on Computer Vision, Bombay, India (1998).

* cited by examiner

IMAGE PROCESSING METHOD

TECHNICAL FIELD

The present invention relates to an image processing method to be adopted to convert image data to a color space optimal for removal of noise from the image and color reproduction.

BACKGROUND ART

There is an image processing method disclosed in the related art (see patent reference 1) adopting the concept of the uniform noise space achieved through square root gradation conversion so as to convert shot noise, which increases by a factor of the square root of the signal intensity, to noise remaining constant relative to the signal intensity. This method, through which the noise fluctuation width, i.e., the standard deviation, is indicated by a single representative value regardless of the gradation, facilitates noise profiling.

For instance, if image data are filtered in a uniform noise space with a σ filter (non-patent reference 1) through which noise is removed by averaging pixel values whose differences are equal to or less than a constant multiple of the standard deviation σ or with a bilateral filter (nonpatent reference 2) through which noise is removed through Gaussian blur by using the ratios of pixel value differences relative to the standard deviation σ as an argument in conjunction with spatial Gaussian blur, the noise can be accurately removed in a manner optimal for the particular image structure, since the standard deviation value is not dependent upon the luminance. If the noise is to be removed without using such a uniform noise space, a process of generating a noise profile by determining the standard deviation in correspondence to each luminance level needs to be executed as disclosed in patent reference 2.

A color space in which the luminance and chrominance are expressed by taking into consideration the human visual system, is often used in image processing. Under normal circumstances, a uniform color space such as L*a*b* is routinely used, since such a uniform color space in which a color signal is expressed in a manner closer to human visual perception, is considered to assure superior color reproduction.

Patent reference 1: Japanese Laid Open Patent Publication No. H7-92588
Patent reference 2: U.S. Pat. No. 5,923,775
Nonpatent reference 1: J. S. Lee "Digital Image Smoothing and the Sigma Filter" Computer Vision, Graphics and Image Processing, Vol. 24, pp 255~269, 1983
Nonpatent reference 2: C. Tomasi et al. "Bilateral Filtering for Gray and Color Images," Proceedings of the 1998 IEEE International Conference of Computer Vision, Bombay, India

DISCLOSURE OF THE INVENTION

Problems to be Solved by the Invention

However, there is still an issue to be addressed with regard to the uniform noise space-technologies proposed in the related art in that the aspect of color uniformity is not taken into consideration. It must also be kept in mind that while the aspect of color uniformity is factored in a uniform color space proposed in the related art, the aspect of noise uniformity is not taken into consideration in the uniform color space technologies in the related art. For this reason, the fully realized performance can be achieved with regard to only either one of the factors taken into consideration in a given space.

Means for Solving the Problems

According to the 1st aspect of the present invention, an image processing method, comprises: inputting color image data obtained by capturing an image at a given imaging sensitivity level; and converting the color image data to a specific uniform color space determined in correspondence to the imaging sensitivity level.

According to the 2nd aspect of the present invention, in the image processing method according to the 1st aspect, it is preferred that when converting the color image data to the uniformcolor space, gradation conversion characteristics based upon which the color image data are converted to the uniform color space are altered in correspondence to the imaging sensitivity level.

According to the 3rd aspect of the present invention, in the image processing method according to the 2nd aspect, it is preferred that the gradation conversion characteristics are nonlinear gradation conversion characteristics.

According to the 4th aspect of the present invention, an image processing method for converting image data having been input, which are expressed by a set of stimulus values having linear gradation characteristics relative to light intensity, to the color signals indicating a perceptive attribute by executing a specific type of nonlinear gradation conversion on the stimulus values assumed in the input image data, comprises: executing the conversion from linear gradation to nonlinear gradation in a state in which an offset signal is applied to each of the stimulus values assumed in the image data.

According to the 5th aspect of the present invention, in the image processing method according to the 4th aspect, it is preferred that through the specific type of nonlinear gradation conversion, the image data are converted to color signals indicating a perceptive attribute that achieves a pseudo-uniform color space.

According to the 6th aspect of the present invention, in the image processing method according to the 4th or the 5th aspect, it is preferred that the specific type of nonlinear gradation conversion is nonlinear gradation conversion having substantially square root characteristics.

According to the 7th aspect of the present invention, in the image processing method according to any one of the 4th through 6th aspects, it is preferred that the offset signal assumes a value of 0 or appositive value.

According to the 8th aspect of the present invention, in the image processing method according to any one of the 4th through 7th aspects, it is preferred that when applying the offset signal to each of the stimulus values assumed in the image data, a value of the offset signal is adjusted in correspondence to the imaging sensitivity level with which the input image data have been captured.

According to the 9th aspect of the present invention, in the image processing method according to any one of the 4th through 8th aspects, it is preferred that a specific width of the color signals resulting from the conversion is designated as a representative value representing noise characteristics of the input image data.

According to the 10th aspect of the present invention, in the image processing method according to the 9th aspect, it is preferred that the specific signal width is determined by capturing an image of a uniform surface, converting image data of the uniform plane to color signals indicating a perceptive attribute through the specific type of nonlinear gradation conversion and then ascertaining a standard deviation of the image data of the uniform plane having undergone the conversion.

According to the 11th aspect of the present invention, in the image processing method according to the 9th or 10th aspect, it is preferred that noise removal processing is executed by utilizing the representative value of the noise characteristics in a color space containing the color signals resulting from the conversion.

According to the 12th aspect of the present invention, in the image processing method according to any one of the 4th through 11th aspects, it is preferred that the input image data are image data expressed with three stimulus values with X, Y and Z constituting reference color stimuli.

According to the 13th aspect of the present invention, in the image processing method according to any one of the 4th through 11th aspects, it is preferred that: the input image data are image data expressed with three stimulus values with R, G and B constituting reference color stimuli; the image data expressed with the three stimulus values with R, G and B constituting the reference color stimuli are converted to image data with three stimulus values X, Y and Z expressed through linear coupling of the reference color stimuli; and the X, Y and Z resulting from the conversion are then converted to the perceptive attribute.

According to the 14th aspect of the present invention, in the image processing method according to any one of the 4th through 11th aspects, it is preferred that: the input image data are image data expressed with three stimulus values with R, G and B constituting reference color stimuli; and the three stimulus values R, G and B first undergo nonlinear gradation conversion while still at an RGB stage and are then converted to the perceptive attribute.

According to the 15th aspect of the present invention, an image processing method, comprises: inputting color image data having linear gradation characteristics; and converting the input color image data to a uniform noise space through nonlinear gradation conversion and also converting the color image data to a uniform color space by using a predetermined conversion expression.

According to the 16th aspect of the present invention, in the image processing method according to the 15th aspect, it is preferred that the input color image data, with an offset signal applied thereto, are converted to the uniform noise space through the nonlinear gradation conversion.

According to the 17th aspect of the present invention, in the image processing method according to the 15th or 16th aspect, it is preferred that: the color image data are converted to an XYZ space defined by X, Y, Z stimulus values; and as the color image data are converted from the XYZ space to the uniform color space, the color image data are converted to the uniform noise space through a square root gradation conversion instead of a cube root gradation conversion.

According to the 18th aspect of the present invention, a computer-readable computer program product comprises an image processing program that enables a computer or an image processing apparatus to execute an image processing method according to any one of the 1st through 17th aspects.

According to the 19th aspect of the present invention, it is preferred that the computer program product according to the 18th aspect is a computer-readable recording medium having recorded therein the image processing program.

According to the 20th aspect of the present invention, an image processing apparatus comprises a control device that executes an image processing method according to any one of the 1 through 17.

Advantageous Effect of the Invention

The present invention adopting the structure described above achieves the following advantages. Since a space achieving both noise uniformity and color uniformity is generated, the noise and the color can be handled very easily, which, in turn, facilitates various types of high-performance image processing. In addition, desirable color noise inhibition and desirable color reproducibility can both be assured by executing the noise removal processing on a chrominance component.

BRIEF DESCRIPTION OF THE DRAWINGS (FIG. 1) An image processing apparatus achieved in an embodiment of the present invention (FIG. 2) A flowchart of the image processing executed in the first embodiment (FIG. 3) A diagram of the signal characteristics that may be observed at the image sensor (FIG. 4) A graph of the linear gradation (FIG. 5) A graph obtained by executing non-linear gradation (square root gradation) conversion on the graph of linear gradation y=x)

(FIG. 6) Cube root gradation conversion executed in the related art when converting image data to the uniform color space CIE L*a*b*

(FIG. 7) The input/output characteristics observed in a linear gradation space, a square root gradation space and an offset-incorporated square root gradation space (FIG. 8) The input/output characteristics observed in a linear gradation space, a square root gradation space and a gradation space expressed in (11)

(FIG. 9) A flowchart of the image processing executed in a second embodiment (FIG. 10) The McAdams deviation ellipses in the chromaticity diagrams for the CIE L*a*b* color space and the CIE L*u*v* color space in the related art.

BEST MODE FOR CARRYING OUT THE INVENTION

First Embodiment

FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

The program that enables the computer 1 to execute the image processing is provided in a recording medium such as a CD-ROM or by another computer via the Internet or another electronic communication network connected to the personal computer in a manner similar to that shown in FIG. 1, and the program thus provided is installed within the personal computer 1. The personal computer 1 comprises a CPU (not shown) and its peripheral circuits (not shown). The installed program is executed by the CPU.

The program to be provided via the Internet or another electronic communication network is converted to and transmitted as a signal on a carrier wave which is carried through the electronic communication network, i.e., a transmission medium. Namely, the program can be distributed as a computer-readable computer program product adopting any of various modes including a recording medium and a carrier wave.

Figure 2:
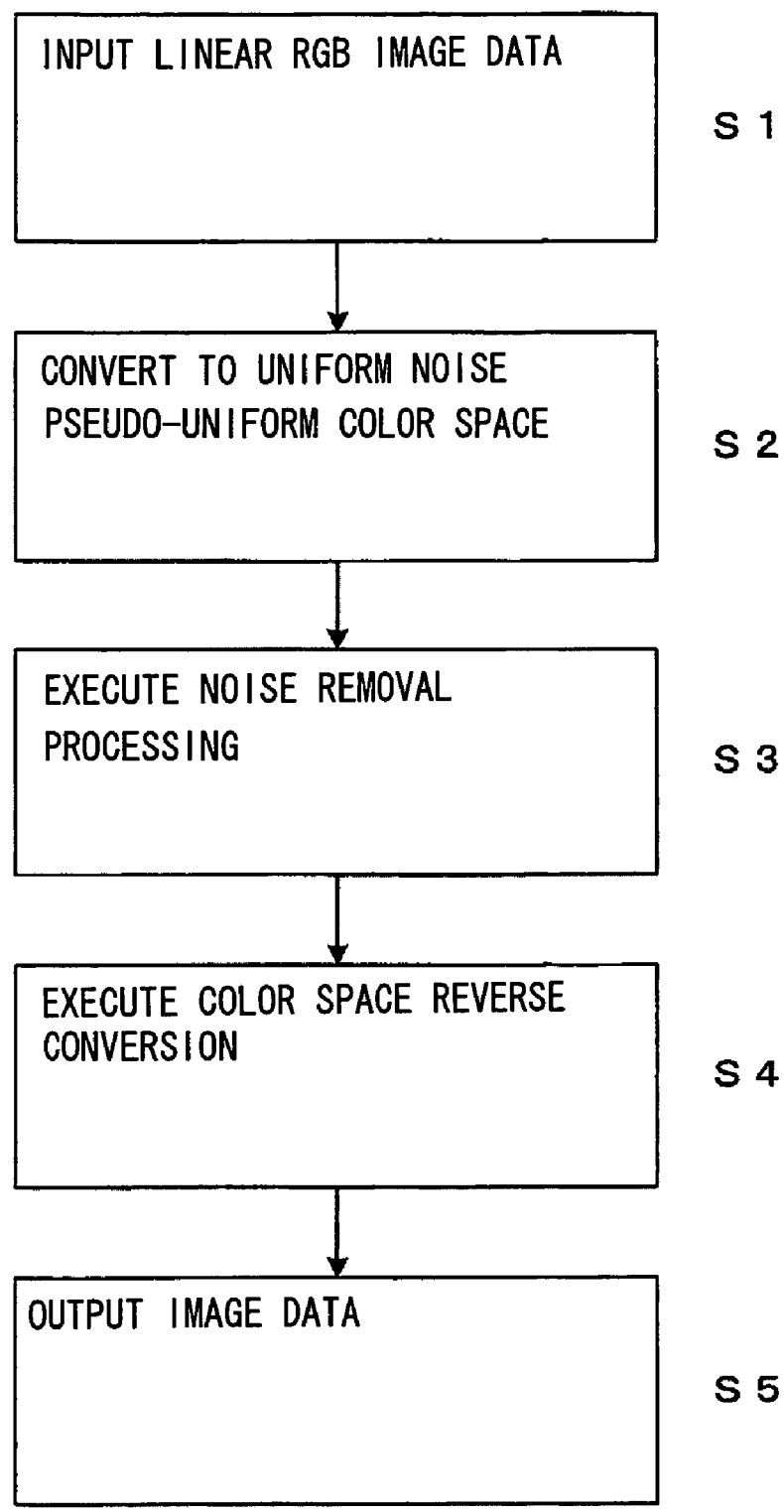

The image processing executed in the personal computer 1 is now explained. FIG. 2 presents a flowchart of the image processing executed by the personal computer 1 in the first embodiment. In step S1, linear RGB image data are input. In step S2, the input data are converted to a uniform noise and pseudo-uniform color space. In step S3, noise removal processing is executed. In step S4, the color space undergoes reverse conversion. In step S5, the image data, having undergone the processing, are output. The following is a detailed explanation of the processing executed in each step.

(1) Image Data Input

The linear RGB image data input in step S1 are RGB colorimetric system data that express a linear gradation. The RGB calorimetric system data, which have been obtained by capturing an image with, for instance, an image sensor (an image-capturing device) such as a CCD equipped with color filters disposed in a Bayer array, will have undergone various types of interpolation processing so that each pixel holds color information corresponding to the R component, the G component and the B component. Linear gradation data are gradation data achieving linearity relative to the light intensity, which assume color information values in proportion to the amount of received light. Data having undergone gamma correction should be structured back into the linear gradation data format before image processing. Such image data may be obtained by capturing an image with the digital camera 2 or another imaging device.

(2) Color Space Conversion

In step S2, the three stimulus values R, G and B in the linear gradation data are converted to values in a color space that constitutes the uniform noise and pseudo-uniform color space. This space is defined in the description of the embodiment as a space obtained by modifying the uniform color space L*a*b* in the related art in consideration of noise uniformity and, for the sake of convenience, is referred to as L^a^b^.

First, the data are converted to XYZ colorimetric system data, which are normally used when defining a uniform color space. The conversion expression will vary depending upon the spectral sensitivity distribution characteristics of the color filters used in the image sensor from which the data are input. For instance, CIE RGB colorimetric system data with the reference stimuli assuming values of 700.0 nm for R, 546.1 nm for G and 435.8 nm for B in a single spectrum may be converted to CIE XYZ colorimetric system data, as expressed below.

$$X = 2.7689R + 1.7517G + 1.1320B \quad (1)$$

$$Y = 1.0000R + 4.5907G + 0.0601B \quad (2)$$

$$Z = +0.0565G + 5.5943B \quad (3)$$

In another example, when handling a color image ultimately expressed in an sRGB color space, the RGB values having been reverted to linear gradation data may be converted to XYZ values as expressed below.

$$X = 0.4124R + 0.3576G + 0.1805B \quad (4)$$

$$Y = 0.2126R + 0.7152G + 0.0722B \quad (5)$$

$$Z = 0.0193R + 0.1192G + 0.9505B \quad (6)$$

Next, the data in the linear gradation XYZ space are converted to a nonlinear gradation L^a^b^ space representing a perceptive attribute with a pseudo-uniform color distribution.

$$L^\wedge = 100 * f(Y/Y_0) \quad (7)$$

$$a^\wedge = 500 * [f(X/X_0) - f(Y/Y_0)] \quad (8)$$

$$b^\wedge = 200 * [f(Y/Y_0) - f(Z/Z_0)] \quad (9)$$

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. In addition, the nonlinear gradation conversion function f( ) is defined in (10) below. It is to be noted that the variable t, expressed as; t=(Y/Y0), t=(X/X0), t=(Z/Z0), assumes a value normalized based upon the maximum value representing the number of gradations for the X, Y and Z values so that the relationship expressed as $0 \leq (Y/Y_0) \leq 1$, $0 \leq (X/X_0) \leq 1$, $0 \leq (Z/Z_0) \leq 1$, are satisfied. It is also to be noted that the notation √A used in the description of the embodiment indicates the square root of A, i.e., rootA.

[Expression 1]

$$f(t) = \sqrt{t + \epsilon} \quad (10)$$

If necessary, the origin point and the saturation point may be normalized by using the following expression.

[Expression 2]

$$f(t) = \frac{\sqrt{t + \varepsilon} - \sqrt{\varepsilon}}{\sqrt{1 + \varepsilon} - \sqrt{\varepsilon}} \quad (11)$$

ε in the expression above represents an offset signal applied to the linear gradation signal. The offset signal assumes the value of zero or a positive value, and its value increases as the imaging sensitivity becomes higher. While ε assumes a value determined based upon the level of dark noise in the sensor, a value very close to zero, for instance, will be assumed when the ISO value is approximately 100 and a value approximately equal to 0.05 will be assumed in correspondence to an ISO value of approximately 6400. Identical results will be achieved regardless of the timing of the offset signal application, i.e., the same results will be obtained by applying the offset signal at the time of the nonlinear gradation conversion, applying the offset signal to the data indicating the X, Y and Z values or applying the offset signal to the data indicating the R, G and B values.

Conversion expressions (7), (8) and (9) are similar to the conversion expressions used to convert the XYZ space to the uniform color space CIE L*a*b*. The conversion expressions differ in that while the conversion expressions used to convert data to the uniform color space CIE L*a*b* each assume a power function with a fractional power of ⅓, expressions (7), (8) and (9) each assume a power function with a fractional power of ½. Another difference lies in that the offset signal ε, which is not factored in the conversion expressions used in the conversion to the uniform color space CIE L*a*b*, is incorporated in expressions (7), (8) and (9).

For reference, an example of the conversion expressions used to convert the data in the XYZ space to those in the uniform color space CIE L*a*b* is presented below.

$$L^* = 116 * (Y/Y_0)^{1/3} - 16 \quad (12)$$

$$a^* = 500 * [(X/X_0)^{1/3} - (Y/Y_0)^{1/3}] \quad (13)$$

$$b^* = 200 * [(Y/Y_0)^{1/3} - (Z/Z_0)^{1/3}] \quad (14)$$

An explanation is now given on how the uniform noise and pseudo-uniform color space can be realized by using conversion expressions (7), (8) and (9) above. The uniform color space achieved by adopting conversion expressions (7), (8) and (9) without modifying the definition of the CIE L*a*b* in the related art to a very significant extent is thus realized as a pseudo-uniform color space. In other words, the uniform color distribution ratios over discriminator meshes indicated by the McAdams deviation (deviatoric) ellipses in a chromaticity diagram are sustained without a major change except for over the dark areas where the gradation characteristics change greatly. FIG. 10(a) shows McAdams deviation ellipses in the chromaticity diagram corresponding to L*=50 in the CIE L*a*b* color space in the related art and FIG. 10(b) shows McAdams deviation ellipses in the chromaticity diagram corresponding to L*=50 in the CIE L*u*v* color space in the related art. The plurality of small McAdams deviation ellipses in the figures achieve substantial uniformity, indicating that both the CIE L*a*b* space and the CIE L*u*v* color space are uniform color spaces. In the uniform noise and pseudo-uniform color space achieved in the embodiment, too, the uniformity of McAdams deviation ellipses is achieved in a manner similar to those shown in FIGS. 10(a) and 10(b).

The other factor, i.e., the noise uniformity, is now described in further detail. The initial linear gradation RGB signals each contain random noise constituted with two elements, i.e., shot noise, which is in proportion to the square root of the signal value and dark noise in the image sensor and the circuit system, which is not dependent on the signal value. With $\sqrt{R}$ representing the shot noise in an R signal and $\sqrt{\epsilon}$ (constant) representing the dark noise in the R signal, the total noise quantities $\delta R$, $\delta G$ and $\delta B$ corresponding to R, G and B can be expressed as below. It is to be noted that the expressions below do not include any constant multiple term. Since $\epsilon$ is a constant, it is notated by adding $\sqrt{}$ in the expressions for the sake of convenience. It is to be noted that Japanese Patent Application No. 2004-200890 (submitted by the inventor of the present invention) discloses that when signals contain both shot noise and the dark noise, a uniform noise space can be realized by applying an offset signal corresponding to the quantity of dark noise prior to the square root gradation conversion.

[Expression 3]

$$\delta R = \sqrt{(\sqrt{R})^2 + (\sqrt{\epsilon})^2} = \sqrt{R+\epsilon} \quad (15)$$

$$\delta G = \sqrt{(\sqrt{G})^2 + (\sqrt{\epsilon})^2} = \sqrt{G+\epsilon} \quad (16)$$

$$\delta B = \sqrt{(\sqrt{B})^2 + (\sqrt{\epsilon})^2} = \sqrt{B+\epsilon} \quad (17)$$

The conversion from the RGB calorimetric system to the XYZ colorimetric system may be expressed as in (18), (19) and (20) below in a rough approximation.

$$X=(R+G)/2 \quad (18)$$

$$Y=G \quad (19)$$

$$Z=B \quad (20)$$

Accordingly, bearing in mind the law of propagation of errors, $\delta X$, $\delta Y$ and $\delta Z$ representing the noise quantities in the X signal, the Y signal and the Z signal respectively, may be written as below.

[Expression 4]

$$\delta X = \sqrt{\left(\frac{\partial X}{\partial R}\right)^2 \delta R^2 + \left(\frac{\partial X}{\partial G}\right)^2 \delta G^2} \quad (21)$$

$$= \frac{\sqrt{R+G+2\epsilon}}{2}$$

$$= \sqrt{\frac{X+\epsilon}{2}}$$

$$\delta Y = \delta G = \sqrt{G+\epsilon} = \sqrt{Y+\epsilon} \quad (22)$$

$$\delta Z = \delta B = \sqrt{B+\epsilon} = \sqrt{Z+\epsilon} \quad (23)$$

If the nonlinear conversion portions are defined as expressed in (24), (25) and (26), it can be ascertained that individual noise quantities $\delta X'$ $\delta Y'$ and $\delta Z'$ each assume a constant value relative to the gradation as indicated in expressions (27), (28) and (29). Namely, by assuming $\epsilon$ corresponding to the dark noise for the offset quantity in the gradation conversion functions in expressions (24), (25) and (26), the noise quantities can be converted to the values representing constant noise relative to the luminance levels of X', Y' and Z' since the noise expansion/contraction occurring as the gradation conversion is executed and the luminance dependency of the initial noise quantities cancel each other out.

$$X'=f(X/X0) \quad (24)$$

$$Y'=f(Y/Y0) \quad (25)$$

$$Z'=f(Z/Z0) \quad (26)$$

[Expression 5]

$$\delta X' = \left|\frac{df}{dX}\right| \delta X \propto \frac{1}{\sqrt{X+\epsilon}} \cdot \frac{\sqrt{X+\epsilon}}{\sqrt{2}} = \frac{1}{\sqrt{2}} = const. \quad (27)$$

$$\delta Y' = \left|\frac{df}{dY}\right| \delta Y \propto \frac{1}{\sqrt{Y+\epsilon}} \cdot \sqrt{Y+\epsilon} = 1 = const. \quad (28)$$

$$\delta Z' = \left|\frac{df}{dZ}\right| \delta Z \propto \frac{1}{\sqrt{Z+\epsilon}} \cdot \sqrt{Z+\epsilon} = 1 = const. \quad (29)$$

As a result, the L^a^b^ expressing with the luminance (brightness) and the chrominances (color differences), which are defined as the results of linear conversion executed on X', Y' and Z' achieving noise uniformity, too, is a uniform noise space. Namely, errors $\delta L^\wedge$ $\delta a^\wedge$ and $\delta b^\wedge$ corresponding to $L^\wedge$, $a^\wedge$ and $b^\wedge$ expressed in (30), (31) and (32) respectively can be calculated as in (33), (34) and (35) each indicating a constant value. In other words, a uniform color space in which noise uniformity is also achieved is realized.

$$L^\wedge=100Y' \quad (30)$$

$$a^\wedge=500(X'-Y') \quad (31)$$

$$b^\wedge=200(Y'-Z') \quad (32)$$

[Expression 6]

$$\delta L^\wedge=100\delta Y'=const. \quad (33)$$

$$\delta a^\wedge=500\sqrt{(\delta X')^2+(\delta Y')^2}=const. \quad (34)$$

$$\delta b^\wedge=200\sqrt{(\delta Y')^2+(\delta Z')^2}=const. \quad (35)$$

(3) Noise Removal Processing

In step S3 in FIG. 2, each plane in the uniform color space $\hat{L}\hat{a}\hat{b}$ having undergone the processing to achieve noise uniformity undergoes noise removal processing, executed with a noise filter by referencing an index representing the noise quantities substantially in a single profile. The noise filters in the related art that may be utilized in such an application include the bilateral filter (non-patent reference 2). However, a bilateral filter different from the bilateral filter in the related art (non-patent reference 2), achieving an even higher level of performance as expressed in the following expressions, is utilized in the embodiment. Namely, smoothing processing is executed so as to smooth signal components fluctuating over a range substantially equal to the range of noise as the signal difference quantity and the distance ratio mutually affect each other within a predetermined range.

(1) Luminance Component $\hat{L}$

[Expression 7]

$$L^{\wedge\prime}(\vec{r}) = \frac{\int_{|\vec{r}'|\leq 2r_{th}} L^{\wedge}(\vec{r}')\exp\left\{-\frac{|L^{\wedge}(\vec{r}')-L^{\wedge}(\vec{r})|^2}{\sigma_{th}^2}\cdot\frac{|\vec{r}'-\vec{r}|^2}{r_{th}^2}\right\}d\vec{r}'}{\int_{|\vec{r}'|\leq 2r_{th}} \exp\left\{-\frac{|L^{\wedge}(\vec{r}')-L^{\wedge}(\vec{r})|^2}{\sigma_{th}^2}\cdot\frac{|\vec{r}'-\vec{r}|^2}{r_{th}^2}\right\}d\vec{r}'} \quad (36)$$

(2) Chrominance Component $\hat{a}$ and $\hat{b}$

[Expression 8]

$$a^{\wedge\prime}(\vec{r}) = \frac{\int_{|\vec{r}'|\leq 2r_{th}} a^{\wedge}(\vec{r}')\exp\left\{-\frac{|a^{\wedge}(\vec{r}')-a^{\wedge}(\vec{r})|^2}{\sigma_{th}^2}\cdot\frac{|\vec{r}'-\vec{r}|^2}{r_{th}^2}\right\}d\vec{r}'}{\int_{|\vec{r}'|\leq 2r_{th}} \exp\left\{-\frac{|a^{\wedge}(\vec{r}')-a^{\wedge}(\vec{r})|^2}{\sigma_{th}^2}\cdot\frac{|\vec{r}'-\vec{r}|^2}{r_{th}^2}\right\}d\vec{r}'} \quad (37)$$

[Expression 9]

$$b^{\wedge\prime}(\vec{r}) = \frac{\int_{|\vec{r}'|\leq 2r_{th}} b^{\wedge}(\vec{r}')\exp\left\{-\frac{|b^{\wedge}(\vec{r}')-b^{\wedge}(\vec{r})|^2}{\sigma_{th}^2}\cdot\frac{|\vec{r}'-\vec{r}|^2}{r_{th}^2}\right\}d\vec{r}'}{\int_{|\vec{r}'|\leq 2r_{th}} \exp\left\{-\frac{|b^{\wedge}(\vec{r}')-b^{\wedge}(\vec{r})|^2}{\sigma_{th}^2}\cdot\frac{|\vec{r}'-\vec{r}|^2}{r_{th}^2}\right\}d\vec{r}'} \quad (38)$$

r→ represents the vector (two-dimensional coordinates) of the processing target pixel and r→' represents the vector (two-dimensional coordinates) of a pixel near the processing target pixel.

The bilateral filter in the related art (nonpatent reference 2) is an adaptive filter whereby both the spatial distance and the pixel value difference are both taken into consideration as arguments (variables, parameters). The filter is referred to as a bilateral filter since it assumes two arguments. The weighting coefficient in the filter is represented by the product of the weighting coefficient w_photo [V'−V] of the photometric term in which the pixel value difference (V'−V) alone is used as an argument and the weighting coefficient w_geometric [r'−r] in the geometric term in which the distance (r'−r) alone is used as an argument.

However, there is a problem with such a bilateral filter in the related art in that since the weighting coefficients corresponding to the two arguments are handled separately, noise or color artifacts manifesting as projecting points remain uncorrected along edges or over color boundaries. Namely, situations in which the noise cannot be removed effectively tend to occur readily since the processing tends to be affected by a factor attributable to either of the arguments alone. For instance, over a color boundary area where the pixel value difference |V'−V| is assumed to increase abruptly, w_photometric[V'−V] assumes a drastically reduced value. As a result, regardless of how close to 1 the value assumed for w_geometric[r'−r] is, the value is disregarded and the noise initially present over the color boundary area cannot be removed.

In the embodiment, an unseparated weighting-type bilateral filter in which the weighting coefficient cannot be separated into the photometric term and the geometric term, instead of the separated weighting-type bilateral filter in the related art in which the weighting coefficient can be separated into the photometric term and the geometric term, is utilized as the noise removal filter. To explain this point in more specific terms, the bilateral filter in the related art assumes a weighting coefficient represented by the product of two exponential functions each assuming one of the two arguments as an exponent thereof. The filter used in the embodiment, on the other hand, assumes a weighting coefficient represented by a single exponential function in which the value indicated by the product of the two arguments is handled as a single exponent. By assuming an integration range that is approximately twice rth, the arithmetic operation can be executed by fully taking into consideration the processing requirement for the Gaussian skirt while minimizing the scale of the arithmetic operation.

The filtering processing is executed separately on the $\hat{L}$ plane, the $\hat{a}$ plane and the $\hat{b}$ plane. The noise component includes the full range of frequency components, from short cycles to long cycles. In order to be able to remove color mottling noise manifesting over long cycles, rth should be set to approximately 20, i.e., the filtering size needs to match a pixel range of approximately 80×80 pixels. Even through such wide-range filtering, the noise can be removed effectively without destroying the image structure since the two factors, i.e., the pixel value difference and the spatial distance, are both taken into consideration.

In addition, the weighting coefficient is calculated only after taking the product of the two arguments, i.e., the pixel value difference and the distance. Thus, even when there is noise manifesting as projecting points, such as a color artifact, present over a steeply graded area, e.g., a color boundary area within the signal plane, the unseparated weighting-type filter in the embodiment, with the spatial distance argument made to favorably affect the pixel value difference argument ultimately generates a finite weighting coefficient so as to achieve effective noise removal, unlike in the separated weighting-type filter in the related art, through which effective noise removal cannot be executed when a sudden decrease in the weighting coefficient in the photometric term becomes a dominant factor.

Furthermore, as the filtering processing is executed over a wider range with the separated weighting-type filter in the related art, the filtering intensity is reduced drastically, which tends to allow color mottling noise over long cycles to remain as color artifacts. In contrast, the unseparated weighting-type filter in the embodiment sustains the desired filtering intensity level even when the distance between pixels is significant, as long as the pixel value difference does not exceed the extent of noise fluctuation and thus, is capable of clean noise removal.

σth in expressions (36), (37) and (38) should assume a value √2 times the standard deviation measured in the uniform noise and pseudo-uniform color space by photographing a uniform surface. In a uniform noise space, the standard deviation assumes a constant value regardless of the luminance level. Accordingly, the noise characteristics of the input image data can be profiled as a single representative value by using this standard deviation. Namely, the standard deviation measured in the uniform noise space of the uniform plane image data can be utilized as the representative value when evaluating the noise characteristics of the input image. The filtering processing described above is executed by using this representative value. The use of such a filter is greatly facilitated in a uniform color space. While σth will assume different values in correspondence to various sensors, σth will assume a value approximately equal to 1 in correspondence to an ISO value of approximately 100 and will take on a value of 10 to 15 in correspondence to an ISO value of approximately 6400, when there are 256 gradations.

Through the method described above, noise removal is executed on the luminance component so as to reduce the grainy fluctuations while retaining the initial image structure such as edges and texture. The noise in each chrominance component is removed by eliminating color mottling noise and color moiré while retaining the initial color structure and assuring a desired level of color reproducibility. The level of noise removal for the luminance component may be adjusted to suit the individual user's preferences, since sharp definition can be sustained only by sacrificing the complete prevention of grainy fluctuations.

It is to be noted that noise removal may be executed by individually applying a σ filter instead of the bilateral filter to the L^ plane, the a^ plane and the b^ plane. In addition, noise removal may be executed by utilizing a unilateral filter, in which the pixel value difference alone is designated as an argument.

(4) Color Space Reverse-Conversion

In step S4 in FIG. 2, the L^a^b^ color space is converted back to the linear gradation RGB color space. The reverse-conversion may be executed by reversing the process defined in expressions (1), (2) and (3), expressions (7), (8) and (9) and the like.

(5) Image Output

In step S5 in FIG. 2, the image data from which the noise has been removed are output. At this point, processing for converting the image data to a standard color space optimal for display, such as the sRGB color space, may be executed.

Through the process described above, the linear gradation image data in the RGB color space are first converted to image data in a uniform color space in which noise uniformity is also achieved. The image data in the uniform color space are then filtered for noise removal. Subsequently, the image data having undergone the noise removal are reverse-converted to image data in the initial linear gradation RGB color space and are output.

The advantages of the embodiment explained above are now described. No matter how superior the adaptive filter used for noise removal may be with minimum image structure damage to the target image in a color space in the related art, the filter cannot assure effective color noise removal and desirable color reproducibility at once due to the uncertainty principle in the quantum mechanics if the filter is used to remove noise manifesting over a wide range such as color mottling noise. While a high level of color reproducibility is assured by using a uniform color space, uniformity in the noise is not achieved in the uniform color space. Thus, the noise processing is bound to be complicated, which, in turn, is bound to lower the noise removal capability.

For instance, an image photographed at a high sensitivity level, e.g., ISO 3200 or ISO 6400, contains a great deal of dark noise. If such an image is processed in the uniform color space L*a*b*, the fluctuation width of the dark noise will be emphasized over an area such as a flat red area due to the ⅓ gamma characteristics without offset. In such a case, the emphasized dark noise fluctuation width will not be contained within the target width over which an intense noise removal effect is achieved, resulting in a look of graininess remaining uncorrected. For similar reasons, a high level of color mottling noise removal performance will not be assured.

By using the color space achieved in the embodiment which may be referred to as a uniform noise and pseudo-uniform color space, the removal of color noise such as color artifacts and a high level of color reproducibility can be assured in an optimal combination.

The uniform noise and pseudo-uniform color space achieved in the embodiment differs from the color space L*a*b* in the related art in that an offset signal is applied to the data assuming R, G and B stimulus values and in that the non-linear gradation conversion is executed by using power functions with a fractional power of ½ instead of a fractional power of ⅓. The offset signal, which lessens the extent of steepness in the increase of the square root over dark areas, is used to ensure that the dark noise remains unemphasized.

It is to be noted that a similar effect will be achieved by applying the offset signal in conjunction with the power functions with a fractional power of ⅓ in the related art as well. Accordingly, although a fully uniform noise space may not be generated, a significant advantage is realized with regard to noise uniformity simply by applying the offset signal to the L*a*b* as defined in the related art while the data assumes RGB stimulus values or XYZ stimulus values.

It would appear that the uniform color spaces in the related art, defined by CIE and the like, were conceived without taking into consideration how image signals constituting high sensitivity photographic data which would require noise removal processing and containing a significant quantity of dark noise, may be handled. An accurate uniform color display would not be realized by nonlinear gradation conversion, which would boost color signals in an area where the true signals were mostly buried in noise. It would be more desirable that when handling such high sensitivity photographic data, the color perception weight be slightly shifted to a lighter area where the color can be recognized more accurately. This shift is realized through the offset processing executed in the embodiment. It is assumed that when the image signals are processed in this uniform color space generated by taking into consideration the quantity of noise contained in the image, favorable image processing results, closer to human perception will be realized.

Figure 3:
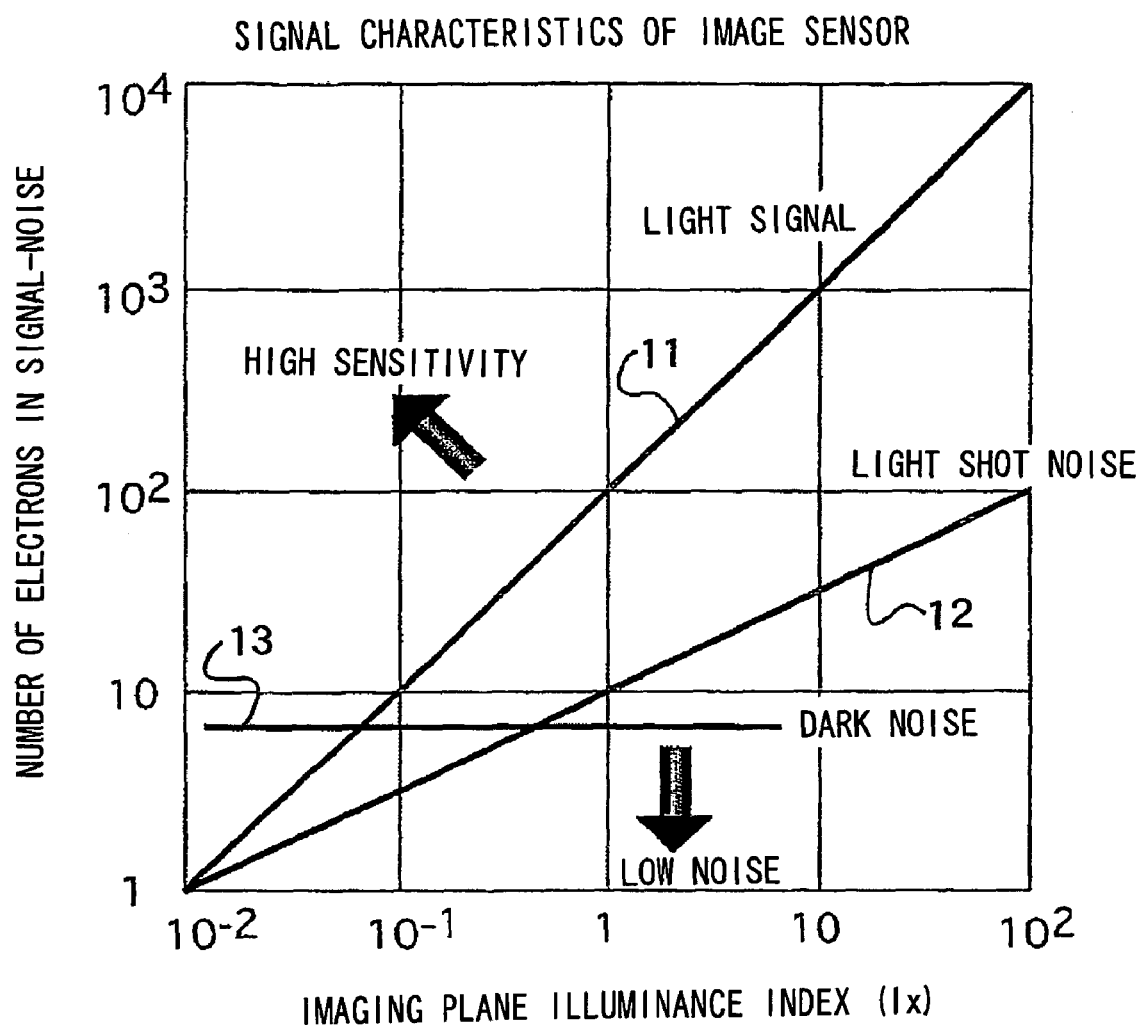

In reference to FIGS. 3 through 8, the uniform noise space is explained in further detail. FIG. 3 is a diagram provided to facilitate an explanation of the signal characteristics observed at the image sensor. In the diagram in FIG. 3, which is presented on a log-log scale, the imaging plane illuminance is indicated along the horizontal axis and the number of electrons in the signal is indicated along the vertical axis. A straight line 11, representing a light signal, indicates that the light signal level (the number of electrons) increases in proportion to the quantity of incident light. A straight line 12, representing light shot noise, indicates that the noise (the number of electrons) increases in proportion to the square root of the amount of incident light. A straight line 13, representing dark noise (thermal electrons), indicates that presence of the noise (the quantity of electrons) is not affected by the amount of incident light.

Figure 4:
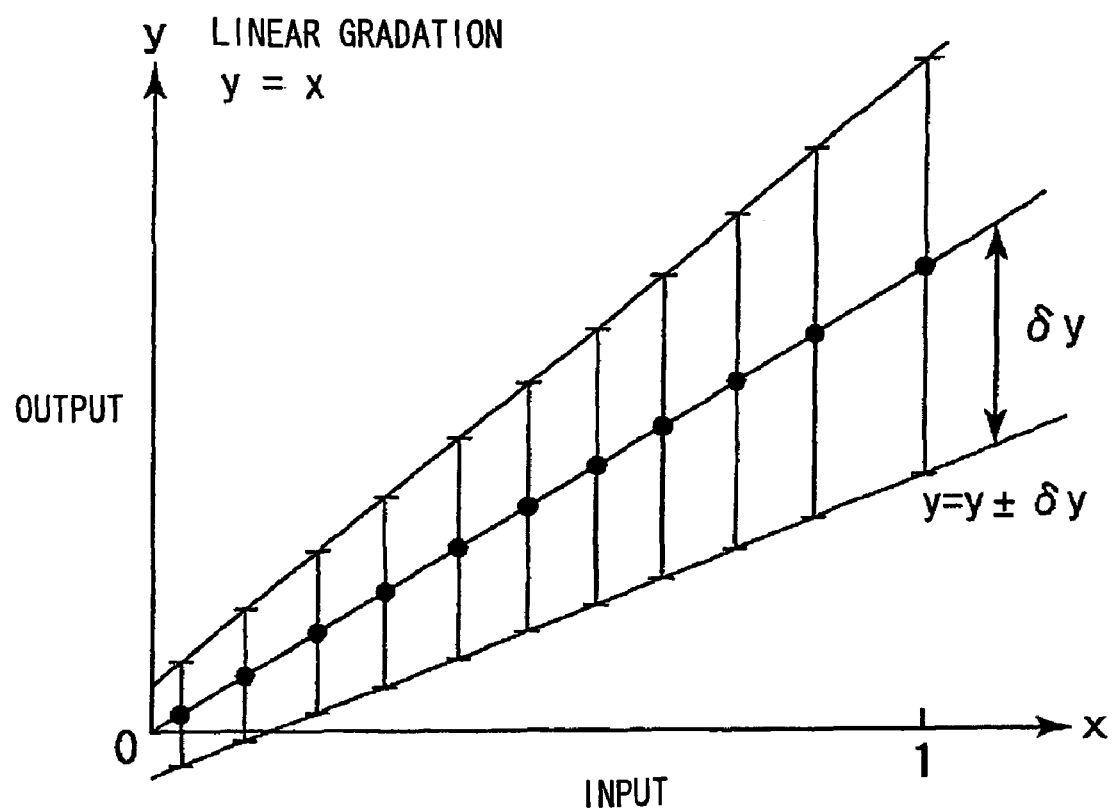

FIGS. 4 through 7 each schematically illustrate a uniform noise space. FIG. 4 presents a graph of linear gradation. The quantity x of light input to the image sensor is indicated along the horizontal axis, whereas the signal output y from the image sensor is indicated along the vertical axis. The graph indicates that the output changes linearly as expressed as; y=x, in correspondence to the quantity of input light. δy, indicating the fluctuation width of the random noise made up with the shot noise and the dark noise, increases by a factor of the square root of the input x excluding the constant component corresponding to the dark noise.

Figure 5:
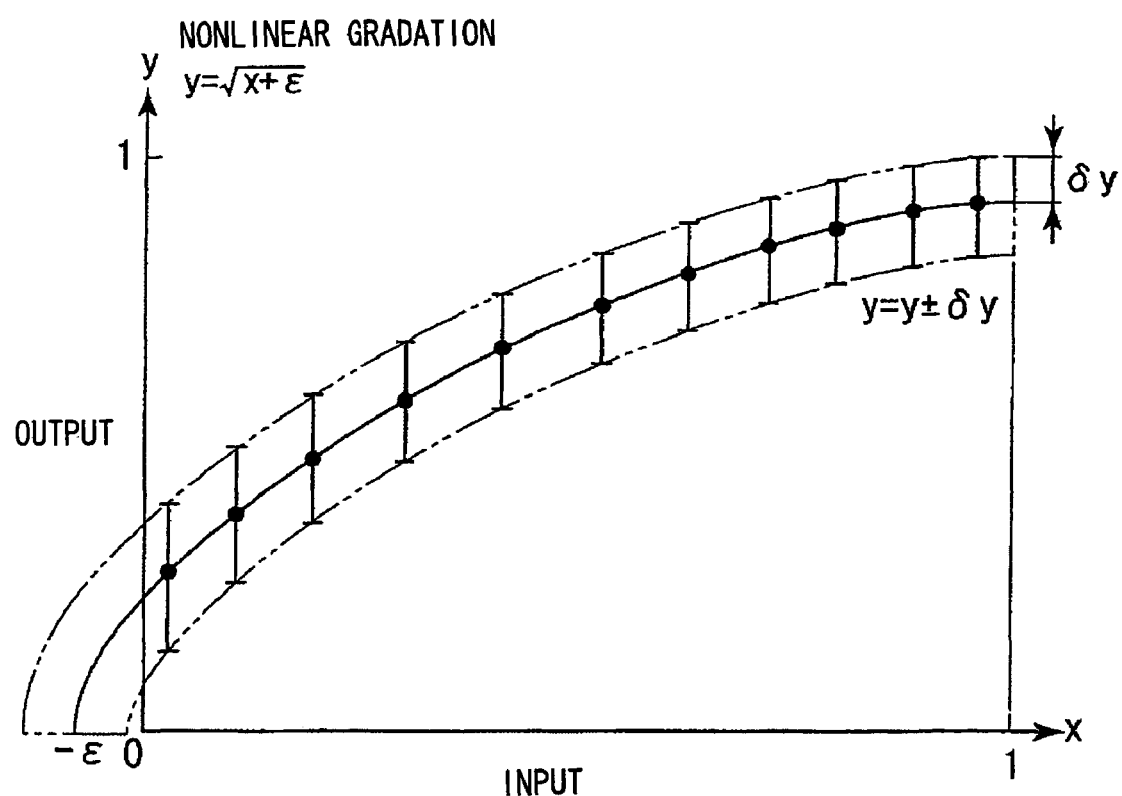
Figure 6:
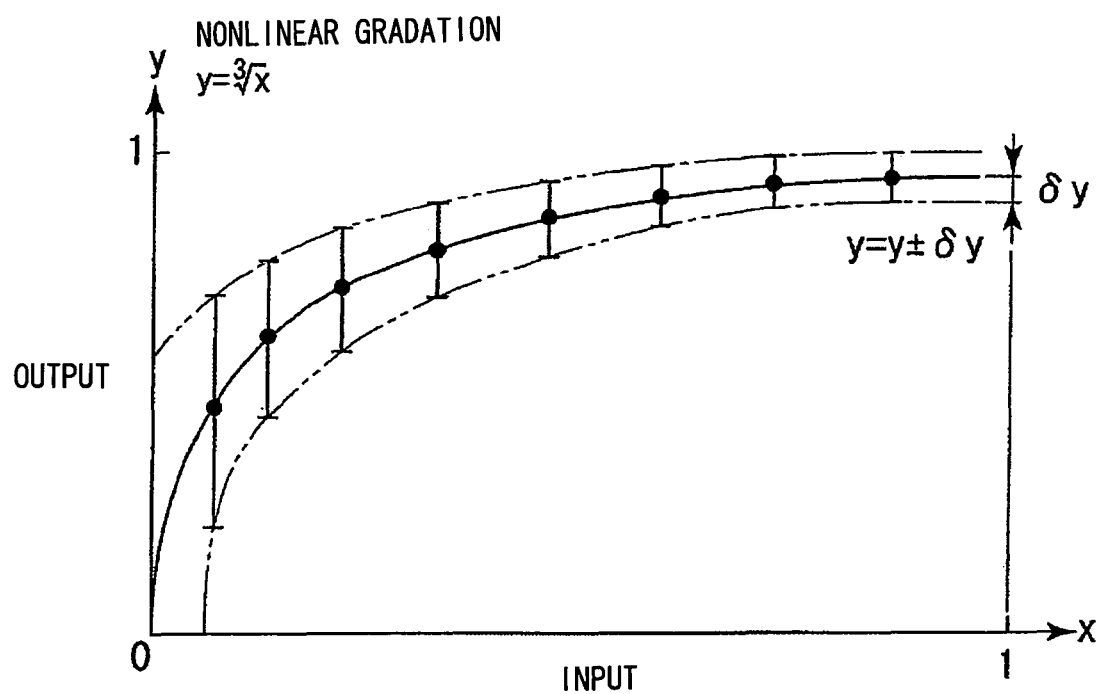

FIG. 5 shows the results obtained by executing nonlinear gradation conversion (square root gradation conversion) on the graph of the linear gradation y=x. The offset ε explained earlier is incorporated in the graph presented in FIG. 5. As FIG. 5 indicates, the random noise δy representing the sum of the shot noise and the dark noise, having undergone the offset-incorporated square root gradation conversion, assumes a constant value regardless of the input value. This proves that through the offset-incorporated square root gradation conversion, a uniform noise space is realized for the random noise representing the sum of the shot noise and the dark noise. It is to be noted that FIG. 6 shows how the cube root gradation conversion is executed to convert image data to the uniform color space CIE L*a*b* in the related art. As FIG. 6 indicates, the random noise δy representing the sum of the shot noise and the dark noise decreases as the input value increases, i.e., the random noise δy does not remain constant, in the uniform color space CIE L*a*b* in the related art. In other words, a uniform noise space with regard to the random noise is not realized through the uniform color space CIE L*a*b* in the related art.

Figure 7:
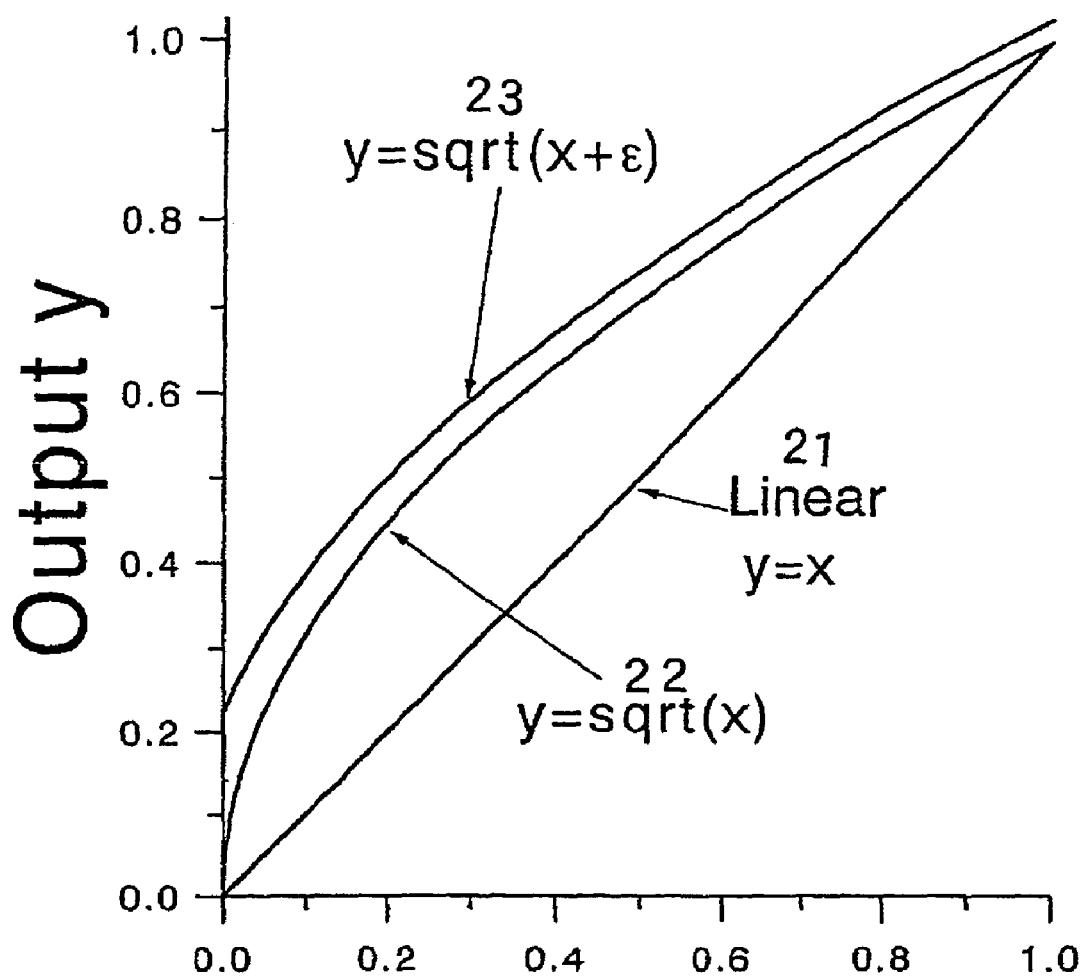

FIG. 7 shows the input/output characteristics observed in the linear gradation space, the square root gradation space and the offset-incorporated square root gradation space. In FIG. 7, the linear gradation signal input value x is indicated along the horizontal axis and the output value y is indicated along the vertical axis. A straight line 21 represents the input/output characteristics observed in the linear conversion, a curve 22 represents the input/output characteristics observed in the square root space conversion and a curve 23 represents the input/output characteristics observed in the offset-incorporated square root space conversion. The curve 23 represents the processing expressed in (10) explained earlier.

The slope of the curve 22 becomes steeper over an area (e.g., 0<x<0.1) where the linear input value is small and the dark noise is dominant, i.e., over the low luminance area. Thus, if a fluctuation attributable to noise occurs in the input value, the fluctuation occurring on the input side will be amplified on the output side. In contrast, in the offset-incorporated square root gradation space (curve 23) achieved in the embodiment, the slope does not become steep even over an area where dark noise is dominant (e.g., 0<x<0.1).

Figure 8:
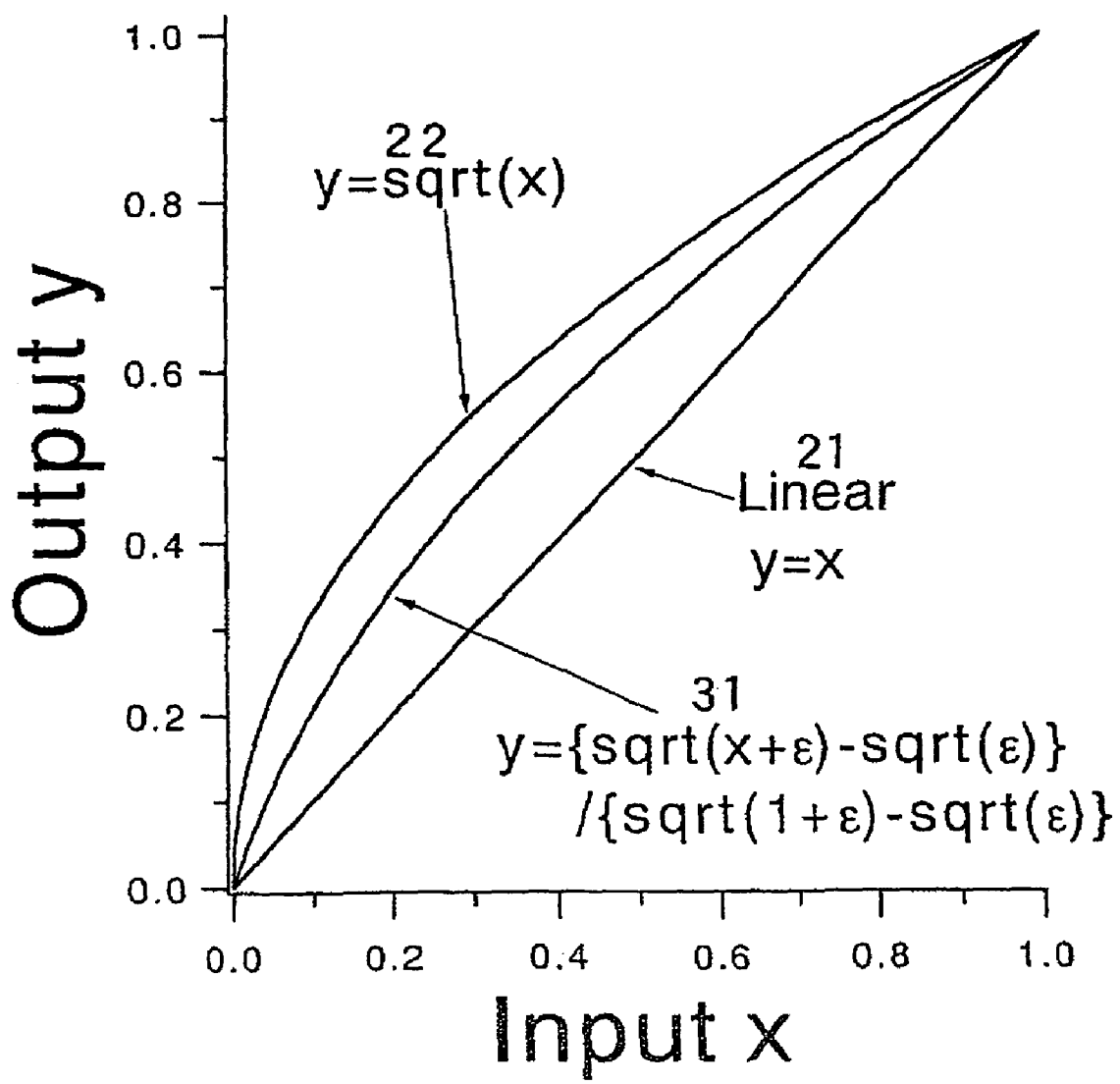

FIG. 8 shows the input/output characteristics observed in the linear gradation space, the square root gradation space and the gradation space expressed in (11). A straight line 21 and a curve 22 are identical to those in FIG. 7 and represent the input/output characteristics observed in the linear conversion and the input/output characteristics observed in the square root space conversion. A curve 31 is obtained by normalizing the origin point and the saturation point as expressed in (11).

Second Embodiment

As expressed in (7), (8) and (9), the data in the linear gradation XYZ space are converted to the nonlinear gradation L^a^b^ space assuming a uniform noise and a perceptive attribute with uniform color distribution in the first embodiment. In the second embodiment, nonlinear conversion is first executed for purposes of achieving noise uniformity on R, G and B stimulus values having been linearly input and then linear conversion is executed so as to generate a uniform color space. Namely, the data still at the RGB stage undergo offset-incorporated square root conversion so as to achieve uniform noise and then the data are defined simply through linear conversion to the XYZ space and through linear conversion to visual perception characteristics. Better connection with high-accuracy interpolation processing executed in a uniform noise space can be assured by adopting this method.

Figure 9:
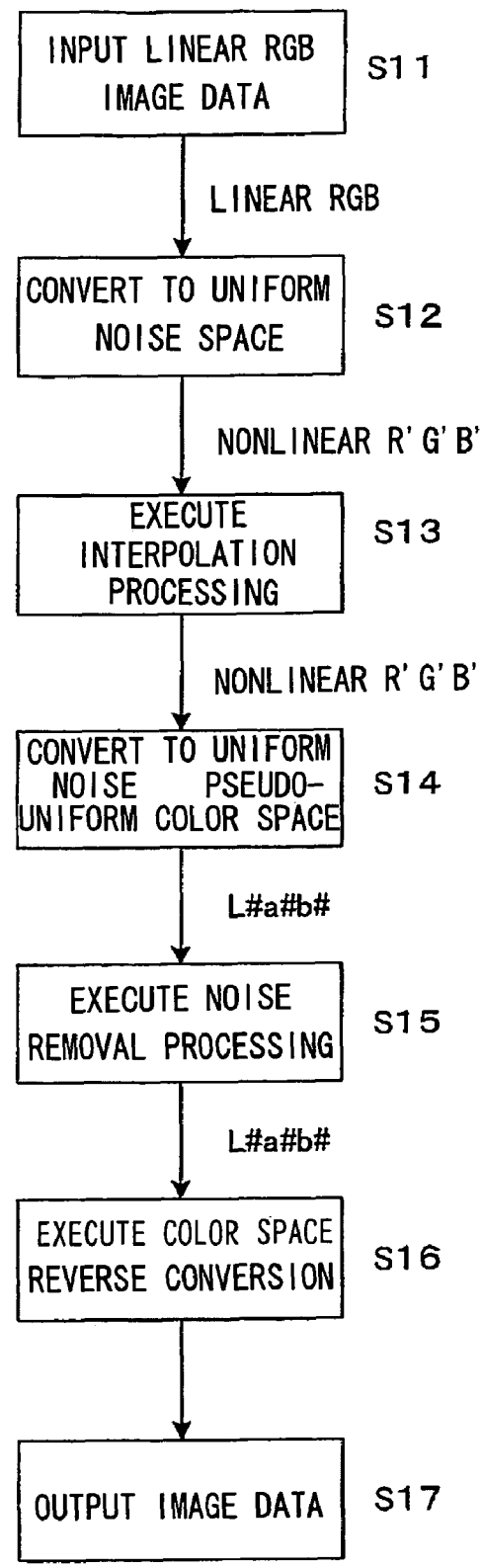
Figure 10:
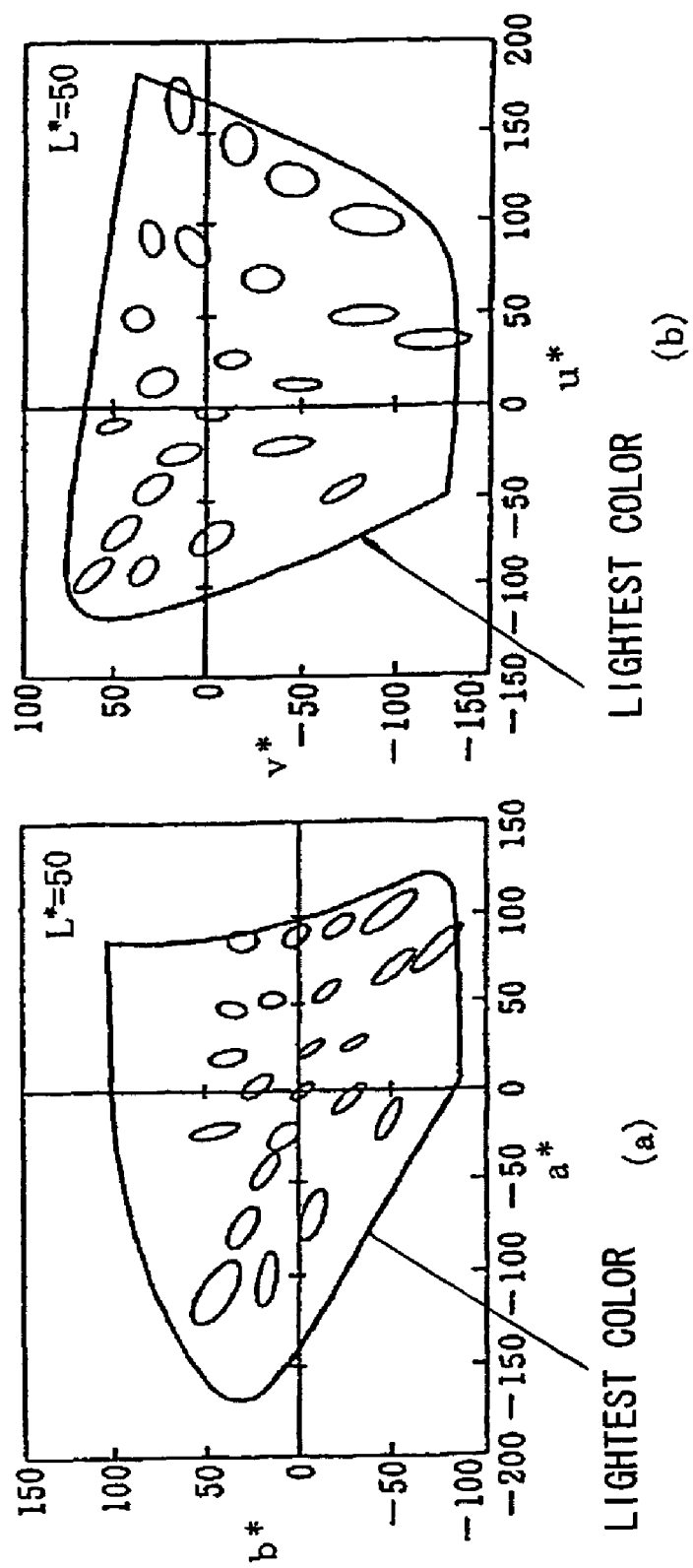

The structure of the image processing apparatus achieved in the second embodiment is similar to that adopted in the first embodiment having been described in reference to FIG. 1 and, accordingly, its explanation is omitted. FIG. 9 presents a flowchart of the image processing executed by the personal computer 1 in the second embodiment.

In step S11, linear RGB image data, e.g., image data obtained by capturing an image at an image sensor equipped with color filters in a Bayer array, are input. At this stage, the data are yet to undergo interpolation processing and thus, each of the pixels holds color information corresponding to the R-component, the G-component or the B-component. In step S12, the data are converted to a uniform noise space. In step S13, the interpolation processing is executed. In step S14, linear conversion is executed on the data so as to convert them to a pseudo-uniform color space, thereby achieving a uniform noise and pseudo-uniform color space. In step S15, noise removal processing is executed. In step S16, the color space is reverse-converted. In step S17, the image data having undergone the processing are output. The following is a detailed explanation of the processing executed in each step.

(1) Image Input

The linear RGB image data input in step S11 are RGB colorimetric system data expressed by using a linear gradation. RGB calorimetric system data, which may have been obtained by capturing an image with an image sensor such as a CCD equipped with color filters disposed in, for instance, a Bayer array, contain R-color component information, G-color component information or B-color component information in correspondence to each of the pixels. These linear RGB image data are yet to undergo the interpolation processing.

(2) Uniform Noise Space Conversion

In step S12, the data are converted to a uniform noise space. Uniformity in the noise containing shot noise and dark noise in the sensor and the circuit system can be achieved by applying an offset signal to the RGB linear gradation data so as to convert the data to data with square root gradation characteristics. The linear RGB image data are converted to nonlinear RGB image data, as expressed in (39), (40) and (41) below with the offset signal ε.

[Expression 10]

$$R' = R'_{max} \frac{\sqrt{\frac{R}{R_{max}} + \varepsilon} - \sqrt{\varepsilon}}{\sqrt{1+\varepsilon} - \sqrt{\varepsilon}} \quad (39)$$

$$G' = G'_{max} \frac{\sqrt{\frac{G}{G_{max}} + \varepsilon} - \sqrt{\varepsilon}}{\sqrt{1+\varepsilon} - \sqrt{\varepsilon}} \quad (40)$$

$$B' = B'_{max} \frac{\sqrt{\frac{B}{B_{max}} + \varepsilon} - \sqrt{\varepsilon}}{\sqrt{1+\varepsilon} - \sqrt{\varepsilon}} \quad (41)$$

ε should assume a value similar to that taken in the first embodiment.

(3) Interpolation Processing

In step S13, the image data having been converted to the uniform noise space under go interpolation processing. As explained earlier, in Bayer image data, for instance, each pixel only holds color information corresponding to one of the color components, i.e., the R-component, the G-component or the B-component, as explained earlier. Accordingly, color information corresponding to the missing color components is generated through interpolation processing for each pixel. Various interpolation processing methods have been proposed to date and the optimal method among them to suit the particular needs of the embodiment should be adopted. It is to be noted that very accurate results can be achieved more easily by assuring noise uniformity in the interpolation processing as well.

(4) Uniform Noise and Pseudo-Uniform Color Space Conversion

The nonlinear R'G'B' data having undergone interpolation processing are then linearly converted to data in a X'Y'Z' space defined as nonlinear data in (42), (43) and (44) below.

$$X' = 2.7689R' + 1.7517G' + 1.1320B' \quad (42)$$

$$Y' = 1.0000R' + 4.5907G' + 0.0601B' \quad (43)$$

$$Z' = +0.0565G' + 5.5943B' \quad (44)$$

The matrix coefficient used for this conversion is the same matrix coefficient as that used in the conversion of the CIE RGB calorimetric system data to CIE XYZ colorimetric system data, both defined as linear gradation data. However, since the expressions presented above define conversion from nonlinear gradation data to nonlinear gradation data, a matrix having been corrected to a slightly further extent may be used, instead.

The nonlinear X'Y'Z' data are further converted to a space achieving pseudo uniform color perception, as expressed in (45), (46) and (47) below. For the sake of convenience, this space is referred to as an L#a#b# space.

$$L\# = 100Y' \quad (45)$$

$$a\# = 500(X' - Y') \quad (46)$$

$$b\# = 200(Y' - Z') \quad (47)$$

A uniform noise and pseudo-uniform color space is thus realized. Since noise uniformity, whereby the noises is not dependent on the gradation, is assured in advance while the data are at the R'G'B' stage, the X'Y'Z' data and the L#a#b# data, resulting from the linear conversion of the data in the uniform noise space, too, are data in uniform noise spaces that are not dependent upon the gradation.

(5) Noise Removal Processing

The noise removal processing is executed as in the first embodiment.

(6) Color Space Reverse-Conversion

In step S16, the L#a#b# color space is converted back to a linear gradation RGB color space. The reverse-conversion may be executed by reversing the process defined in the expressions described earlier. Alternatively, the data in the L#a#b# color space may be converted to data in another color space as desired.

(7) Image Output

In step S17, the image data having undergone the noise removal are output. In the embodiment, the data will have been converted to a uniform color space by first converting them to X'Y'Z' data defined with a simulated nonlinear gradation instead of converting the data to XYZ data defined with the standard linear gradation. This means that when the data output from the image sensor undergo interpolation processing and noise removal processing in succession, it is not necessary to reconvert the gradation in the uniform noise space used in the interpolation processing to linear gradation and then execute nonlinear gradation conversion on the data to convert the data to a uniform noise and uniform color space in preparation for the noise removal processing. In other words, the data in the uniform noise space are allowed to shift directly into the uniform noise and uniform color space, resulting in a reduction in the number of arithmetic operations needed to be executed for color space conversion and assuring even better connection with the interpolation processing.

It is to be noted that an explanation has been given above in reference to the embodiments on an example in which a uniform noise space is achieved through square root gradation conversion executed by applying an offset signal. However, if the level of dark noise is low enough, a uniform noise space can be generated through the square root gradation conversion alone. At the same time, even through nonlinear gradation conversion that does not assume the square root gradation characteristics, the principal object, i.e., noise uniformity, can be achieved with the dark noise in the image sensor and the circuit system approximately taken into consideration, by simply executing an offset operation on RGB stimulus values or XYZ stimulus values.

Accordingly, the present invention may be adopted in conjunction with the CIECAM97 data, CIECAM02 data, iCAM data and the like having been disclosed more recently, as well as the L*u*v* data, the Hunter Lab data and the LABHNU data, since they are each data, which can be basically linearly converted to/from the XYZ colorimetric system data and are data in a color system defined through conversion from linear gradation to nonlinear gradation.

In the description of the embodiments, the color space according to the present invention is referred to as a "pseudo-uniform color space". The word "pseudo" has been selected since a space similar to the L*a*b* space known as a uniform color space in the related art is generated according to the present invention. However, it is to be noted that according to the present invention a different uniform color space is generated in correspondence to a given imaging sensitivity level. Thus, the pseudo-uniform color space according to the present invention may be regarded as an even more accurate uniform color space compared to the uniform color space in the related art.

While the filter used in the embodiments is defined as in (36)~(38), the present invention is not limited to this example. For instance, depending upon whether or not the pixel value difference is greater than the profiled representative value σ, 2σ or the like, the weighting coefficient may be set to 0 (if the difference is greater) or 1 (if the difference is smaller) and the average value may be calculated by using the pixel values in conjunction with which the weighting coefficient is set to 1.

While the processing is executed by the personal computer 1 in the embodiments described above, the present invention is not limited to this example and the processing may be executed in an imaging apparatus such as a camera or another type of apparatus. In other words, the present invention may be adopted in all types of apparatuses in which image data are handled.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:

Japanese Patent Application No. 2004-365881 filed Dec. 17, 2004.

The invention claimed is:

1. An image processing apparatus comprising:
a processor that:
inputs color image data obtained by capturing an image at a given imaging sensitivity, the input color image data includes RGB values having linear gradation characteristics;
executes a first conversion to a uniform color and uniform noise space on the input color image data, wherein:
in the first conversion, the RGB values are transformed into CIE XYZ values, and the CIE XYZ values having been transformed are converted to $L\hat{\ }a\hat{\ }b\hat{\ }$ values having non linear characteristics by using a function $f(t)=(t+\epsilon)^{1/2}$ where f(t) denotes an output gradation scale, t denotes an input gradation scale and $\epsilon$ denotes a positive offset having an increasing function increasing according to a value of the imaging sensitivity, the $L\hat{\ }$ designating a luminance value and the $a\hat{\ }$ and $b\hat{\ }$ designating chrominance values;
executes a specific image processing on the color image data having undergone the first conversion, the specific image processing being executed by using the $L\hat{\ }a\hat{\ }b\hat{\ }$ values having been converted;
executes a second conversion reverse to the first conversion on the color image data having undergone the specific image processing; and
outputs the color image data having undergone the second conversion.

2. An image processing apparatus according to claim 1, wherein:
the specific image processing includes noise removal processing.

3. An image processing apparatus according to claim 1, wherein:
the CIE XYZ values are converted to the $L\hat{\ }a\hat{\ }b\hat{\ }$ values by using expressions:

$L\hat{\ }=A*f(Y/Y0),$ $a\hat{\ }=B*[f(X/X0)-f(Y/Y0)]$, and $b\hat{\ }=C*[f(Y/Y0)-f(Z/Z0)]$ where A, B and C are constant values, and X0, Y0 and Z0 are values determined in correspondence to an illuminating light.

4. An image processing apparatus comprising:
a processor that:
inputs color image data obtained by capturing an image at a given imaging sensitivity, the input color image data includes RGB values having linear gradation characteristics;
executes a first conversion to a uniform color and uniform noise space on the input color image data, wherein:
in the first conversion, the RGB values are transformed into CIE XYZ values, and the CIE XYZ values having been transformed are converted to $L\hat{\ }a\hat{\ }b\hat{\ }$ values having non linear characteristics by using a function $f(t)=(t+\epsilon)^{1/3}$ where f(t) denotes an output gradation scale, t denotes an input gradation scale and $\epsilon$ denotes a positive offset having an increasing function increasing according to a value of the imaging sensitivity, the $L\hat{\ }$ designating a luminance value and the $a\hat{\ }$ and $b\hat{\ }$ designating chrominance values;
executes a specific image processing on the color image data having undergone the first conversion, the specific image processing being executed by using the $L\hat{\ }a\hat{\ }b\hat{\ }$ values having been converted;
executes a second conversion reverse to the first conversion on the color image data having undergone the specific image processing; and
outputs the color image data having undergone the second conversion.

5. An image processing apparatus according to claim 4, wherein:
the specific image processing includes noise removal processing.

6. An image processing apparatus according to claim 4, wherein:
the CIE XYZ values are converted to the $L\hat{\ }a\hat{\ }b\hat{\ }$ values by using expressions:

$L\hat{\ }=A*f(Y/Y0)-16,$ $a\hat{\ }=B*[f(X/X0)-f(Y/Y0)]$, and $b\hat{\ }=C*[f(Y/Y0)-f(Z/Z0)]$ where A, B and C are constant values, and X0, Y0 and Z0 are values determined in correspondence to an illuminating light.

* * * * *